United States Patent Office 3,516,958
Patented June 23, 1970

3,516,958
NEW OIL MODIFIED THERMOSETTING RESINS
Daniel J. Carlick, Berkeley Heights, N.J., assignor to Inmont Corporation, New York, N.Y., a corporation of Ohio
No Drawing. Continuation-in-part of application Ser. No. 861,443, Dec. 23, 1959. This application Jan. 17, 1966, Ser. No. 520,864
Int. Cl. C09d 3/30, 3/60
U.S. Cl. 260—23.7                    5 Claims

ABSTRACT OF THE DISCLOSURE

An oil modified thermosetting resin comprising the product of the reaction at a temperature of 500 to 600° F. of a mixture of a homopolymeric cyclopentadiene resin having more than 5 repeating units per molecule produced by the catalized addition polymerization of cyclopentadiene and a member selected from the group consisting of semi-drying oils and drying oils in a volatile organic solvent. Such resins are particularly useful in air dried lacquers, varnishes and paints. Films formed of them have great flexibility and consequently provide excellent coatings for the inside of cans.

---

This invention relates to new oil modified thermosetting resins. More particularly, it relates to oil modified polycyclopentadiene resins. This application is a continuation-in-part of my application Ser. No. 861,443, filed Dec. 23, 1959, and now abandoned.

Polycyclopentadiene resins which are produced by the catalyzed addition polymerization of cyclopentadiene in a solvent medium in accordance with the procedures set forth in U.S. Pats. Nos. 2,314,903, 2,314,908, 2,314,909, 2,314,910, and 2,314,911 have been used to provide varnishes which heat cure upon baking to a hard mar resistant coating which displays excellent adhesion to metal and wood surfaces. However varnishes containing these resins do not provide desirable air dried coatings. Polycyclopentadiene resins oxidize very rapidly in air to form a brittle powder. Such degradation has made the use of such resins in air-drying lacquers, paints and varnishes highly impractical. In addition, as these resins have poor compatibility with oils, they cannot be modified by oil plasticizers to provide compositions flexible enough to be used as coatings for the inside of cans which coating must be flexible enough to withstand the drawing and bending of can fabrication.

There has now been discovered a new class of oil modified polycyclopentadiene resins which are not subject to the rapid oxidation and consequent degradation of polycyclopentadiene resins and are, therefore, very desirable in air dried lacquers, varnishes and paints.

These modified resins also produce films which have greater flexibility than films of the unmodified polycyclopentadiene and consequently provide excellent inside can coatings.

It should also be noted that while varnishes containing the polycyclopentadiene resins of the above patents are limited to aromatic solvents, the oil modified resins of this invention are soluble in most aliphatic solvents which are of course less expensive and safer than aromatic solvents.

In order to provide the novel oil modified polycyclopentadiene resins of this invention, the oil is added to a solution of polycyclopentadiene in a strong aromatic solvent. The solvent is then removed by distillation and the oil and polycyclopentadiene resin are reacted with one another by heating the mixture to 500° F.–600° F. The product may then be dissolved in a volatile organic solvent to provide a varnish. The oil modified resin is soluble in most volatile aromatic and aliphatic solvents.

Although the illustrative examples which follow disclose the use of soya, menhaden, dehydrated castor, linseed and China wood oils, it will be obvious to those skilled in the art that any commercially available drying or semi-drying oil may be used. There are no practical limits to the oil lengths of the produced resins. These may vary between 1 and 250 gallons.

In an alternative process for the production of the resin of this invention, methanol is first added to the polycyclopentadiene in solvent medium. A rubbery mass forms which is subsequently reacted with the modifying oil.

Resins such as rosin may be used as diluents by adding such resins to the initial reaction mixture of oils and polycyclopentadiene. There are no critical limitations on the proportions of resins thus added. In fact, the polycyclopentadiene has been modified with only rosin.

The practice of this invention is illustrated in the following examples:

EXAMPLE 1

To 500 g. of a 40% by weight polycyclopentadiene resin solution in high-flash naphtha in which the polycyclopentadiene molecules each contain more than 5 cyclopentadiene monomers and the polycyclopentadiene resin is prepared in accordance with the procedure of Pat. No. 2,314,903, particularly, page 3, col. 1, lines 53 to 74, there is added 312 g. of alkali refined linsed oil. The mixture is heated slowly to 340° F. at which point the high-flash naphtha starts to distill. Heating is continued and when the temperature reaches 450° F., the distillation of the naphtha is completed. The residue is heated to 500° F.–600° F. and maintained at this temperature for 40 minutes. A clear cold bead results. The product is dissolved in 512 g. of mineral spirits. The resulting resin has an oil length of 20 gallons.

EXAMPLE 2

Example 1 is repeated with the same reactants in the following proportion:

|  | G. |
|---|---|
| 40% polycyclopentadiene resin | 250 |
| Linseed oil | 39 |
| Mineral spirits [1] | 140 |

[1] A high-flash narrow boiling range petroleum fraction having a K.B. value of 38.

The resulting resin has an oil length of 5 gallons.

EXAMPLE 3

Example 1 is repeated using the following reactants:

|  | G. |
|---|---|
| 40% polycyclopentadiene solution | 750 |
| Dehydrated castor oil | 240 |
| Mineral spirits | 500 |

EXAMPLE 4

Example 1 is repeated using the following reactants:

|  | G. |
|---|---|
| 40% polycyclopentadiene solution | 500 |
| Soya bean oil | 468 |
| High-flash naphtha (in place of mineral spirits) | 675 |

The resulting resin has an oil length of 30 gallons.

EXAMPLE 5

Example 1 is repeated using the following reactants:

|  | G. |
|---|---|
| 40% polycyclopentadiene solution | 500 |
| Soya bean oil | 468 |
| High-flash naphtha | 525 |

The resulting resin has an oil length of 20 gallons.

EXAMPLE 6

Example 1 is repeated using the following reactants:

| | G. |
|---|---|
| 40% polycyclopentadiene solution | 500 |
| Menhaden oil | 468 |
| High-flash naphtha | 675 |

The resulting resin has an oil length of 30 gallons.

EXAMPLE 7

500 g. of 40% by weight solution of the polycyclopentadiene resin described in Example 1 in high-flash naphtha in which the polycyclopentadiene molecules each contain more than 5 cyclopentadiene monomers is mixed with 200 g. of rosin and heated to 79.5° C. at which point, the high-flash naphtha begins to distill. The distillation is continued while the temperature slowly rises to 250° C. at which point, the high-flash naphtha stops distilling off. The product is a solid dark resin.

EXAMPLE 8

526 grams of a 40% by weight solution of the polycyclopentadiene resin described in Example 1 in high-flash naphtha in which the polycyclopentadiene molecules each contain more than 5 cyclopentadiene monomers is mixed with 351 g. of dehydrated castor oil and 75 g. of rosin. The mixture is heated to 340° F. at which point the high-flash naphtha begins to distill off. The temperature is raised to 480° F. over a 10 minute period at which point, the coming off of the naphtha discontinues. The temperature is raised to and maintained at 575° F. for a 15 minute period. The mixture is cooled to 450° F. and 625 g. of high-flash naphtha is added. The resinous product is separated by filtration. It has a 15 gallon oil length.

EXAMPLE 9

To 175 g. of 40% by weight solution of the polycyclopentadiene resin described in Example 1 in high-flash naphtha in which the polycyclopentadiene molecules each contain more than 5 cyclopentadiene monomers, there is added 40 g. of methanol. A cloudy rubbery mass forms. To 125 g. of this rubbery mass, 255 g. China wood oil is added and the mixture is slowly heated to 410° F. The temperature is then raised to 557° F. over a period of 45 minutes. The product is then cooled and 380 g. of mineral spirits are added. The product is a clear varnish having a high viscosity.

The varnishes of Examples 1–4 were roller coated on to tin plate and cured by baking for 10 minutes at 400° F. The cured films showed excellent resistance to steam processing, withstanding 60 minutes contact with steam without showing any appreciable discontinuity of film or film blush. The cured films also showed good fabrication resistance, that is film prepared in accordance with this invention could be fabricated into can ends without seriously disrupting the film.

The polycyclopentadiene resins used for illustration in the examples are prepared using the catalysts of U.S. Pat. No. 2,314,903. However, the catalysts described in U.S. Pats. 2,314,908, 2,314,909, 2,314,910 and 2,314,911 may be readily substituted for the catalysts used in the examples.

While there have been described what is at present considered to be the preferred embodiments of this invention, it will be obvious to one skilled in the art that various changes and modifications may be made therein without departing from the invention, and it is, therefore, aimed to cover all such changes and modifications as fall within the true spirit and scope of the invention.

What is claimed is:

1. An oil modified thermosetting resin comprising the product of the reaction at a temperature of 500 to 600° F. of a mixture of a homopolymeric cyclopentadiene resin having more than 5 repeating units per molecule produced by the catalyzed addition polymerization of cyclopentadiene and a member selected from the group consisting of semi-drying oils and drying oils in a volatile organic solvent.

2. A resin according to claim 1, being the reaction product of a homopolymeric cyclopentadiene resin and dehydrated castor oil.

3. A resin according to claim 1, being the reaction product of a homopolymeric cyclopentadiene resin and linseed oil.

4. A resin according to claim 1, being the reaction product of a homopolymeric cyclopentadiene resin and soya bean oil.

5. The resin of claim 1 wherein the reaction mixture further includes rosin.

References Cited

UNITED STATES PATENTS

| 3,088,927 | 5/1963 | Dissen | 260—22 |
| 3,098,834 | 7/1963 | Jerabek | 260—23.7 |

DONALD E. CZAJA, Primary Examiner

D. J. BARRACK, Assistant Examiner

U.S. Cl. X.R.

260—27, 33.6